United States Patent [19]

Wold

[11] Patent Number: 4,678,205

[45] Date of Patent: Jul. 7, 1987

[54] METHOD AND APPARATUS FOR USE WITH A SAFETY HARNESS

[76] Inventor: Jay S. Wold, 2202 S. Emerson, Gillette, Wyo. 82716

[21] Appl. No.: 740,480

[22] Filed: Jun. 3, 1985

[51] Int. Cl.⁴ .............................................. B60R 22/00
[52] U.S. Cl. .................................... 280/808; 297/482
[58] Field of Search ............... 280/801, 808; 297/483, 297/482, 484; 24/49 TS, 49 M, 49 CC, 3 L

[56] References Cited

U.S. PATENT DOCUMENTS

| 876,172 | 1/1908 | Grossgebauer | 24/49 TS |
| 2,990,551 | 7/1961 | Schreter et al. | 24/49 TS |
| 3,397,913 | 8/1968 | Fein | 297/482 |

FOREIGN PATENT DOCUMENTS

| 2436608 | 5/1980 | France | 297/482 |
| 2048651 | 12/1980 | United Kingdom | 280/801 |
| 1581996 | 12/1980 | United Kingdom | 297/482 |

Primary Examiner—John J. Love
Assistant Examiner—Karin L. Ferriter
Attorney, Agent, or Firm—Klaas & Law

[57] ABSTRACT

A covering of comfortable material is provided with means so that it can be joined to the safety harness of a vehicle and be readily moved to a position where it will be in contact with the user of the safety harness. The covering of comfortable material will automatically move to a storage position when the safety harness is removed and released.

2 Claims, 4 Drawing Figures

METHOD AND APPARATUS FOR USE WITH A SAFETY HARNESS

FIELD OF THE INVENTION

This invention relates generally to the use of the safety harness in a vehicle and is particularly directed to method and apparatus for enhancing the use of the safety harness in a vehicle, such as an automobile, by providing a comfortable material covering the conventional safety harness.

BACKGROUND OF THE INVENTION

For many years, all types of vehicles, such as automobiles, trucks, airplanes and other similar vehicles, have been provided with some type of safety harness. While it is basically no problem for the manufacturer to install the safety harness in the vehicle, there exists a major problem in getting the operator or occupant of the vehicle to use the safety harness. The manufacturers have varied the safety harness in many different ways to promote the use of the safety harness by the operator or occupants of the vehicle. These efforts have not proven successful since statistics have shown that a great proportion of operators or occupants of a vehicle do not use the safety harness which has been installed in the vehicle. In fact, some states have passed laws making it mandatory for the operator and occupants of a vehicle to use the safety harness. Thus, there exists a great need to enhance the use of the safety harness in a vehicle.

BRIEF DESCRIPTION OF THE INVENTION

This invention provides a method and apparatus for enhancing the use of the safety harness in a vehicle by covering a portion of the safety harness which generally contacts the user with a comfortable material. The covering of comfortable material is provided with means so that is may be readily moved to a desired location so as to contact the user and be automatically moved to a storage position when the safety harness is removed and released by the user.

In a preferred embodiment of the invention, the covering of comfortable material comprises two rectangularly shaped pieces of quilting, or other similar material, having two relatively long sides and two relatively short sides. The two pieces of quilting are secured together in superposed relationship, such as by stitching. A spring clip is provided for joining the covering of comfortable material to the safety harness and is secured by inserting one portion of the spring clip through an opening in one of the pieces of quilting and securing it in place. The spring clip has a length substantially greater than its width and is positioned with its length extending in a direction generally parallel to the relatively short sides of the pieces of quilting. The open end of the spring clip faces the centerline between the relatively long sides of the pieces of quilting. The pieces of quilting are provided with a Velcro fastener secured along some of the relatively long sides and the other half of the Velcro fastener secured along the other of the relatively long sides.

The covering of comfortable material is joined to the safety harness by inserting a portion of the safety harness into the spring clip. The covering of comfortable material is then wrapped around a portion of safety harness and the long sides of the pieces of quilting are secured together using the Velcro fastener. When the user applies the safety harness, the covering of comfortable material is moved relative to the safety harness by the user so that it is in a position to contact the body of the user. After the covering of comfortable material has been properly positioned, relative movement between the safety harness and the covering of comfortable material will not result in relative movement between the user and the covering of comfortable material. When the safety harness is removed and released by the user, the safety harness and the covering of comfortable material will be moved by the retrieval means of the safety harness until the covering of comfortable material contacts a suitable stop. The safety harness will then move relative to the covering of comfortable material until it reaches its fully retrieved position. At that time, the covering of comfortable material will also be in its stored position.

It is an object of this invention to provide method and apparatus for enhancing the use of the safety harness in a vehicle.

It is another object of this invention to provide a covering of comfortable material to be positioned around a portion of the safety harness in a vehicle and be readily moved relative to the safety harness to a position so as to contact the user.

It is a further object of this invention to provide a covering of comfortable material to be positioned around a portion of the safety harness in a vehicle which covering will be automatically moved to a storage position when the safety harness is removed and released by the user.

It is still a further object of this invention to provide a covering of comfortable material to be positioned around a portion of the safety harness in a vehicle so that, after the covering of comfortable material has been positioned on the user, relative movement between the safety harness and the covering of comfortable material will not result in relative movement between the user and the covering of comfortable material.

Additional objects, advantages, and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

DETAILED DESCRIPTION OF THE INVENTION

Figure 1:
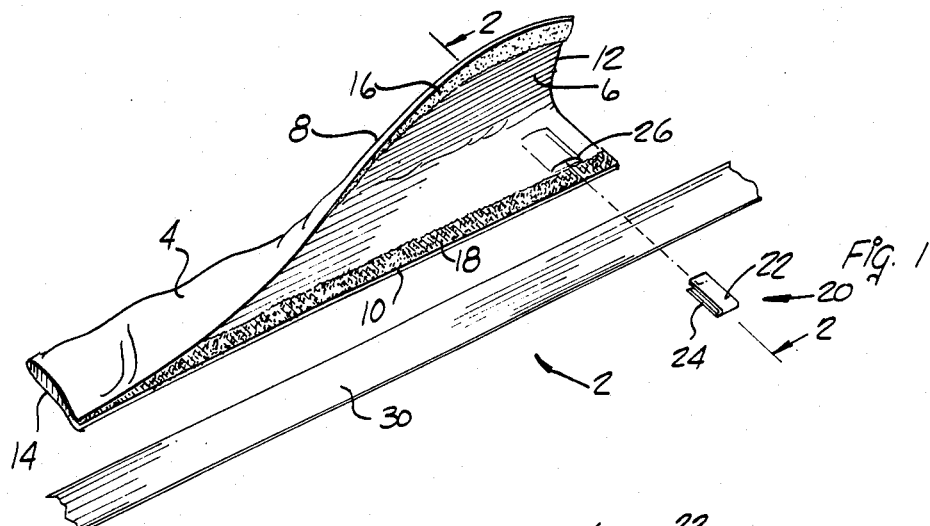
FIG. 1 is an exploded view of the apparatus of this invention.
Figure 2:
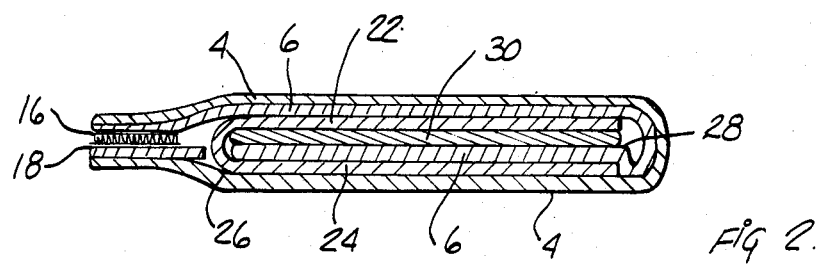
FIG. 2 is a cross-sectional view passing through the clip when the invention is in use.

In FIG. 1, there is illustrated an exploded view of a preferred embodiment of the apparatus 2 of this invention and comprises two rectangular pieces 4 and 6 of comfortable material which are secured together in superposed relationship by suitable means, such as stitching (not shown). The pieces 4 and 6 of comfortable material comprise soft quilting or other similar material. The pieces 4 and 6 of comfortable material when secured together, have two relatively long sides 8 and 10 and two relatively short sides 12 and 14.

One half 16 of a Velcro fastener is secured to the piece 6 of the comfortable material along the relatively long side 8 and the other half 18 of the Velcro fastener is secured to the piece 6 of the comfortable material along the relatively long side 10. The Velcro fastener functions in its conventional way.

A spring clip 20 having an upper half 22 and a lower half 24 is provided. An opening 26 is formed in the piece 6 of comfortable material adjacent to the other half 18 of the Velcro fastener so that the lower half 24 of the spring clip 20 may be inserted therethrough. Also, the opening 26 is adjacent to but spaced from the relatively short side 12. The spring clip 20 has a length substantially greater than its width and when in its assembled position, its length is generally parallel to the short sides 12 and 14. The lower half 24 of the spring clip 20 is inserted through the opening 26 so that the space between the upper half 22 of the spring clip and piece 6 of comfortable material faces the centerline 28 between the two relatively long sides 8 and 10. Suitable means (not shown), such as stitching may be used to maintain the spring clip 20 in an assembled position.

The apparatus 2 is installed by opening the two halves 16 and 18 of the Velcro fastener. A portion of a safety harness 30 is inserted between the upper half 22 of the spring clip 20 and the piece 6 of comfortable material. The pieces 4 and 6 of comfortable material are then wrapped around the safety harness 30 and the two halves 16 and 18 of the Velcro fastener are secured together.

Figure 3:
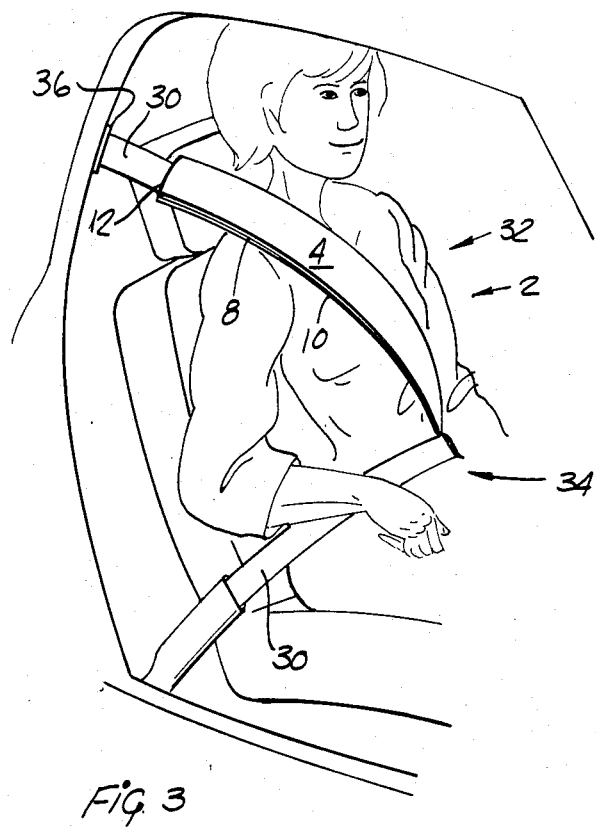
FIG. 3 is a pictorial view of one use of the invention.

The use of the apparatus 2 of this invention is illustrated in FIG. 3 wherein the safety harness 30 has been positioned across the body 32 and lap 34 of a person. The apparatus 2 has been moved relative to the safety harness 30 so that it is properly positioned across the body 32 of the person. In the position illustrated in FIG. 3, the apparatus 2 of this invention provides a piece of comfortable material in contact with the body 32 of the person. If desired, another apparatus 2 of this invention could be used to provide a piece of comfortable material in contact with the lap 34 of the person. Another particular advantage that is gained by the use of this invention, as illustrated in FIG. 3, is when the person is required to move with the safety harness 30 in position across the body 32. As the person moves, there is relative movement between the apparatus 2 and the safety harness 30, but no relative movement between the body 32 of the person and the apparatus 2. Thus, there is no uncomfortable rubbing action that would occur without the use of apparatus 2 of this invention. While an adult person is illustrated in FIG. 3, it is understood that the invention can be used with safety harness designed for use by any one, such as a child.

When the safety harness is removed and released by the person, the retrieving means (not shown) associated with the safety harness 30 will move the safety harness 30 and the apparatus 2 until the edge 12 contacts a stop 36. The safety harness 30 will continue to move while the apparatus 2 remains stationary in a stored position until its next use.

Figure 4:
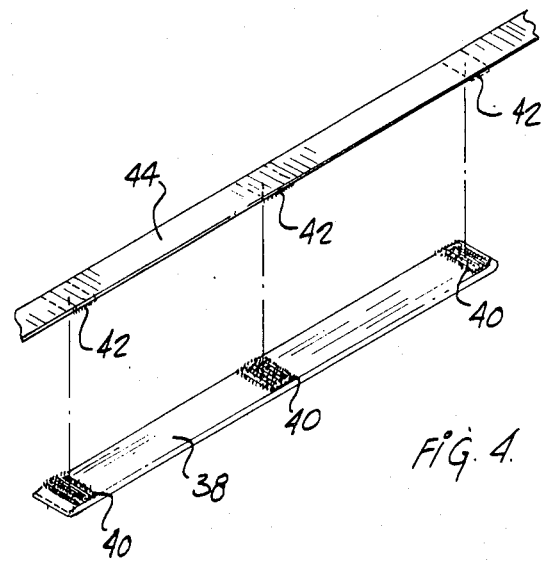
FIG. 4 is another modification of the invention.

Another embodiment of the invention is illustrated in FIG. 4 and comprises a piece 38 of comfortable material, such as quilting, which is provided at spaced apart intervals with halves 40 of a Velcro fastener. The other halves 42 of the Velcro fastener are secured to the safety harness 44 when desired by joining the halves 40 and 42 of the Velcro fastener.

One of the advantages of the apparatus of this invention is the ability of the comfortable material to absorb moisture. This leads to another advantage in that the apparatus is readily removable so that it can be washed.

It is contemplated that the inventive concepts herein described may be variously otherwise embodied and it is intended that the appended claims be construed to include alternative embodiments of the invention except insofar as limited by the prior art.

What is claimed is:

1. Apparatus for enhancing the use of safety harness in a vehicle comprising:
   means for covering a portion of the safety harness with a comfortable material;
   means for joining said covering means to said safety harness so that said covering means may be readily moved to a desired location when said safety harness is applied by said user, will move relative to said safety harness but remain stationary relative to said user when said user moves and automatically move to a storage position when said safety harness is released by said user;
   said means for joining said covering means to said safety harness comprising:
   a spring means;
   about one-half of said spring means being embedded in said covering means; said covering means comprising:
   two rectangularly shaped pieces of comfortable material having two relatively long sides and two relatively short sides;
   means securing said two rectangularly shaped pieces of material in superposed relationship; means for surrounding said safety harness with said covering means comprising:
   a "Velcro" fastener;
   one-half of said "Velcro" fastener secured to said covering means adjacent to one of said relatively long sides;
   the other half of said "Velcro" fastener secured to said covering means adjacent to the other of said relatively long sides; said spring means comprising:
   a spring clip having a length greater than its width;
   the lower half of said spring clip being located and secured between said two rectangularly shaped pieces of comfortable material with said length extending in a direction parallel to said relatively short sides; and
   the opening of said spring clip facing the centerline between said long sides.

2. Apparatus as in claim 1 wherein:
said safety harness comprising a shoulder belt.

* * * * *